United States Patent [19]

Manizza

[11] Patent Number: 4,632,302
[45] Date of Patent: Dec. 30, 1986

[54] SHALLOW WALL BAKING TRAY

[75] Inventor: Guelfo A. Manizza, Blauvelt, N.Y.

[73] Assignee: Federal Paper Board Co., Inc., Montvale, N.J.

[21] Appl. No.: 307,100

[22] Filed: Sep. 30, 1981

[51] Int. Cl.[4] .............................................. B65D 5/20
[52] U.S. Cl. .................................. 229/171; 229/41 B; 229/182; 229/903
[58] Field of Search ..................... 229/30, 41 B, 41 D, 229/34 HW, 171, 182, 903; 206/557

[56] References Cited

U.S. PATENT DOCUMENTS

| | | | |
|---|---|---|---|
| 978,569 | 12/1910 | Elkin | 229/34 HW |
| 1,929,144 | 10/1933 | Kearney | 229/30 |
| 2,074,314 | 3/1937 | Fleischer | 229/30 |
| 2,135,021 | 11/1938 | Falkind | 229/34 HW |
| 2,623,682 | 12/1952 | Candell | 229/34 R |
| 3,325,080 | 6/1967 | Persson | 229/34 HW |
| 3,825,169 | 7/1974 | Meyers | 229/34 A |
| 4,164,315 | 8/1979 | Pennanen | 229/34 R |

Primary Examiner—William Price
Assistant Examiner—Gary E. Elkins
Attorney, Agent, or Firm—Charles E. Brown; Charles A. Brown

[57] ABSTRACT

This relates to a tray which is useful for many purposes and wherein the tray may be shipped in a knocked-down state and is readily erected by an ultimate user manually or automatically. The tray includes a base panel having upstanding side walls which are not connected at their remote ends to one another. The side walls remain in upstanding positions by means of a simple locking flap arrangement. In the original blank state, each side wall is defined along a respective edge of a base panel by an inner sidewall panel and outer sidewall panel, the two sidewall panels being connected together along a fold line and the inner sidewall panel being connected to the base panel along a fold line interrupted at regular intervals by C-shaped caddy cuts. The flat blank is partially erected by the manufacturer by folding the outer sidewall panels beneath the inner sidewall panels and gluing them together in face-to-face relation. This may be accomplished on conventional equipment and the thus folded blank is ready for shipment to the customer. When the side walls are to be erected, they are merely folded upwardly until the outer sidewall panels snap past the projecting locking flaps which were defined by the caddy cuts.

4 Claims, 7 Drawing Figures

U.S. Patent  Dec. 30, 1986  4,632,302
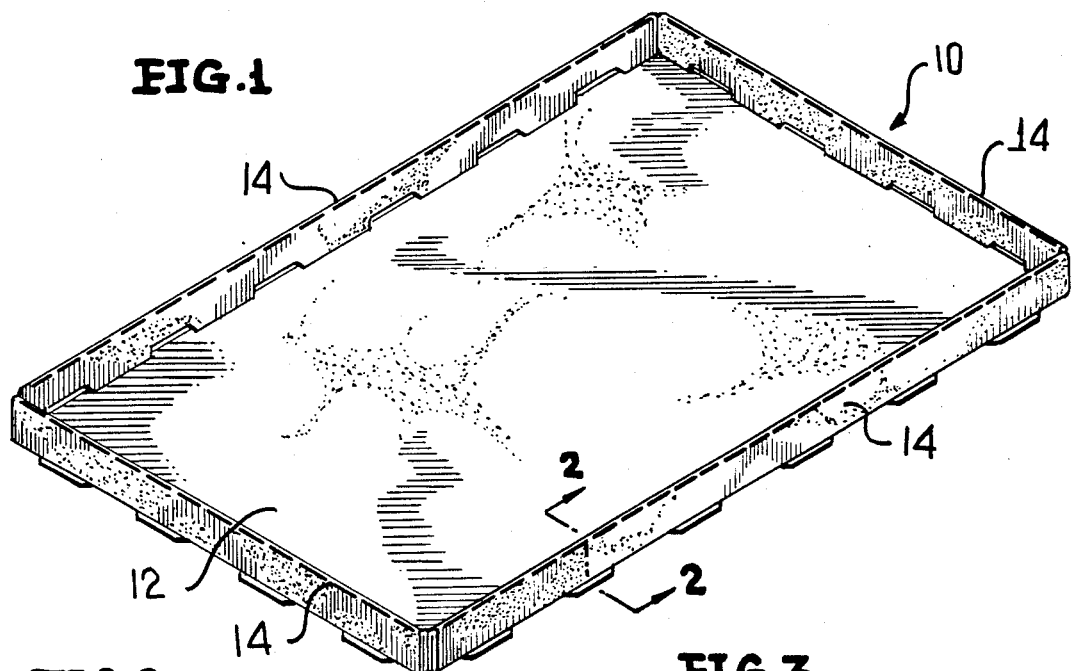
FIG. 1
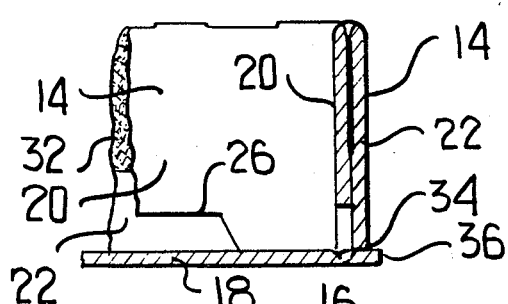
FIG. 2
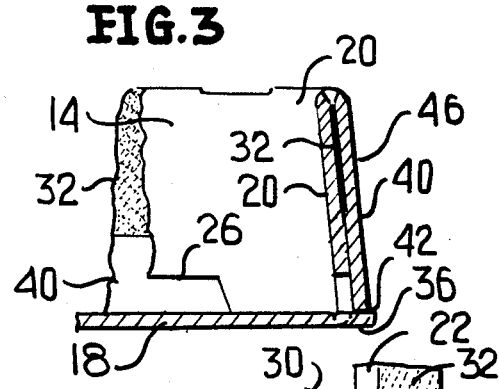
FIG. 3
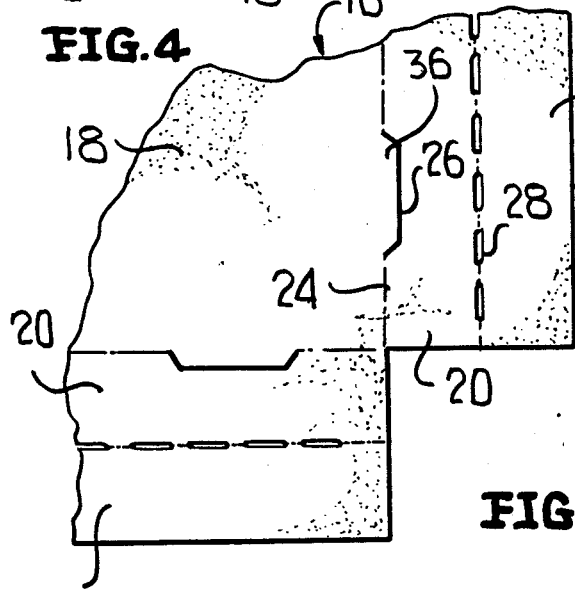
FIG. 4
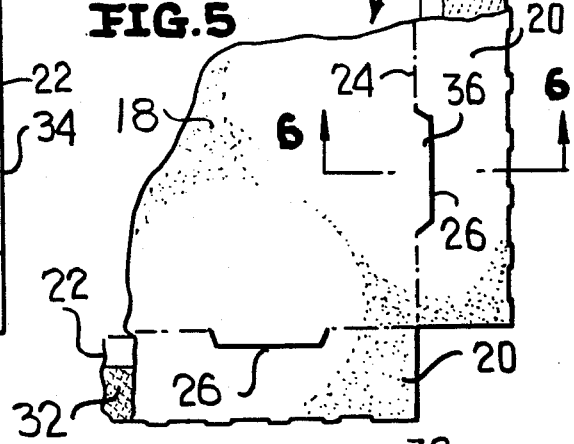
FIG. 5
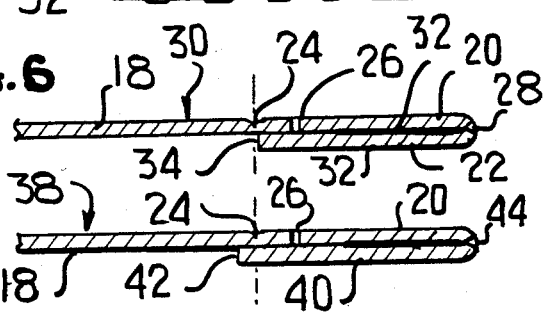
FIG. 6
FIG. 7

4,632,302

SHALLOW WALL BAKING TRAY

This invention relates in general to new and useful improvements in trays, and more particularly to a shallow wall tray which may be formed of suitable ovenable paperboard.

There is a requirement for cookie sheets, pizza pans, etc. made of ovenable paperboard as a replacement for aluminum. In many cases, the sidewalls needed to make the tray rigid enough for use on paperboard have to be at least ¾ inch to 1 inch high to allow for gluing of the corners in the conventional fashion. On the other hand, for very thin products, such as pizza, the side walls of the tray cannot rise over the height of the product thickness for packing and shipping purposes. As a result, the industry, until this time, has been unable to develop suitable baking pans and sheets for shallow products.

This invention relates to a solution to the problem which allows shallow sidewalls, easy erection, from a flat state by hand or automatically, and a means for accomplishing rigidity and stability in spite of shallow depth. The invention also allows easy erection from the flat shippable state without gluing or locking. While gluing is required, the sidewalls can be glued on conventional right angle equipment in the manufacturer's plant.

A tray formed in accordance with this invention has the advantages of not requiring machine equipment for setup, of being made in a variety of depths and sizes, and of being extremely rigid due to the double wall construction and stand up feature.

In accordance with this invention, there is provided a flat blank which is formed of paperboard, preferably ovenable paperboard, which includes a base which has formed along selected sides thereof inner and outer sidewall panels which are formed integrally therewith and wherein the outer sidewall panel is connected to a respective inner sidewall panel along an outer fold line, and the inner sidewall panel is connected to the base along an inner fold line, and the inner fold line is interrupted at intervals by a plurality of C-shaped caddy cuts formed in the respective inner sidewall panel and opening towards the base panel.

In accordance with this invention, the thus formed blank is further formed by the manufacturer by folding the outer sidewall panels into face-to-face relation to the inner sidewall panel and gluing the same thereto. The caddy cuts now overlie the outer sidewall panels.

The thus formed blank is now ready for erection into the desired tray. It is merely necessary to fold each double sidewall panel to an upright position to the point where the lower edge of the outer sidewall panel snaps over locking flaps defined by the caddy cuts. The double sidewalls are now locked in upstanding positions. The tendency of the inner sidewall to return to the original plane of the blank urges the double sidewall outwardly, but being restrained by the locking flaps, the double sidewall retains a vertical position.

In some instances, it may be desirable that the upstanding double sidewall slope slightly inwardly of the tray. In such event, the outer sidewall is made of a width slightly greater than of the inner sidewall and thus when the outer sidewalls react with the locking faps, the double sidewall is tilted slightly inwardly.

With the above and other objects in view that will hereinafter appear, the nature of the invention will be more clearly understood by reference to the following detailed description, the appended claims, and the several views illustrated in the accompanying drawings.

FIG. 1 is a perspective view of a tray formed in accordance with this invention and shows the general details of a conventional rectangular tray.

FIG. 2 is an enlarged fragmentary transverse sectional view taken generally along the line 2—2 of FIG. 1 and shows the cross section of the tray adjacent one edge thereof.

FIG. 3 is a fragmentary enlarged sectional view similar to FIG. 2 and shows a slightly modified double sidewall construction.

FIG. 4 is a fragmentary plan view showing one corner of a blank from which the tray of FIG. 1 is formed.

FIG. 5 is a fragmentary plan view of the blank of FIG. 4 showing the same with the outer sidewall panels folded beneath and glued to the inner sidewall panels.

FIG. 6 is an enlarged fragmentary sectional view taken generally along the line 6—6 of FIG. 5 and shows an outer edge portion of the prepared blank of FIG. 5 from which the tray of FIGS. 1 and 2 is erected.

FIG. 7 is an enlarged fragmentary sectional view similar to FIG. 6 showing the prepared blank from which the tray of FIG. 3 is erected.

Referring now to the drawings in detail, it will be seen that there is illustrated in FIG. 1 a tray formed in accordance with this invention, the tray being generally identified by the numeral 10. The tray 10 includes a base panel 12 and upstanding double wall sidewalls 14 along the edges thereof.

Reference is now made to FIG. 4 wherein there is illustrated a portion of a blank from which the tray 10 is formed. The blank, which is generally identified by the numeral 16, includes a central base panel 18 which has formed along each side edge thereof an inner sidewall panel 20 and an outer sidewall panel 22. Each sidewall panel 20 is integrally connected to the base panel 18 along a respective side edge thereof along a fold line 24. The fold line 24 is interrupted at spaced intervals by generally C-shaped or caddy cuts 26 which are formed primarily in the inner sidewall panel 20 and open towards the base panel 18.

Each outer sidewall panel 22 is integrally connected to a respective one of the inner sidewall panels 20 along an outer fold line 28.

Although only one corner of the blank 16 has been illustrated, it is to be understood that the other corners of the blank will be of the same general construction so that along each side edge of the blank 16 there will be an inner sidewall panel 20 and an outer sidewall panel 22.

It is also pointed out here at this time that while the illustrated tray 10 is rectangular in outline and there is an upstanding double wall sidewall 14 along each edge thereof, it is feasible to eliminate the double wall sidewall at, for example, one end of the tray. It is further feasible to form the tray 10 of a configuration other than rectangular.

The thus described blank 16 is passed through conventional right angle equipment and the outer sidewall panels 22 are reversely folded beneath the inner sidewall panels 20 and glued thereto to form a readily marketable blank 30, as is illustrated in FIG. 5. Once again only one corner of the blank 30 is illustrated. It will be seen that the blank 30 differs from the blank 16 only in that the outer sidewall panels 22, having been folded beneath the inner sidewall panels 20 do not appear. However, as is clearly illustrated in FIG. 6, each outer sidewall panel 22 has been folded about the fold line 28 and now underlies the respective inner sidewall panel 20 and is adhesively bonded thereto as at 32. It is also to be noted that the outer sidewall panel 22 is of a width relative to the inner sidewall panel 20 that an outer edge 34 of the outer sidewall panel 22 is now substantially aligned with the fold line 24. The thus formed blank 30 is now ready for shipment to the customer.

Depending upon the usage by the customer, the prefolded and preglued blank 30 may be shipped in its flat state, or it may be set up to form the tray 10, as shown in FIG. 1. In order to obtain the upstanding double wall sidewalls 14, it is merely necessary to fold the glued together sidewall panels 20 and 22 out of the plane of the base 18 to an upstanding position where at the free edge 34 of the outer sidewall panel 22 snaps around and over locking flaps 36 which are defined by the caddy cuts 26, as shown in FIG. 2. It will be readily apparent that the tendency of the inner sidewall panel 22 to return to the original plane of the base 18 serves to swing the side wall 14 in a clockwise direction, as viewed in FIG. 2. However, this movement is prevented by the locking flaps 36 which engage under the free edge 34 of the outer sidewall panel 14. Thus retention of the side walls 14 in upstanding positions is automatic and no further gluing or reinforcement is required.

Reference is now made to FIG. 7 wherein there is illustrated a slightly modified form of folded blank, generally identified by the numeral 38. The blank 38 includes a base panel 18 which has joined thereto inner sidewall panels 20 along the fold line 24 and wherein caddy cuts 26 formed in the inner sidewall panel 20 interrupt the fold line 24.

The blank 36 differs from the blank 30 only in that there are outer sidewall panels 40 which are slightly longer or wider than the inner sidewall panels 20. The outer sidewall panels 40 have free edges 42 which extend beyond the fold lines 24 so as to underlie the base panel 18. The outer sidewall panels 40 may have a width greater than the width of the inner sidewall panels 20 on the order of 1/32 inch or the like.

The outer sidewall panels 40, of course, are connected to the inner sidewall panels 20 along fold lines 44 along which they are folded to underlie the inner sidewall panels 20. The outer sidewall panels 40 are then glued to the inner sidewall panels 20 in the manner described with respect to the blank 16.

Referring now to FIG. 3, it will be seen that since the outer sidewall panel 40 is wider than the inner sidewall panel 20, it does not snap over the locking flaps 36 until the resultant side wall 46 tilts slightly inwardly. The thus formed side wall 46 is useful in keeping the side walls from collapsing outwardly.

Although a primary use of the tray 10 is in conjunction with products which are to be baked, it is to be understood that the tray 10 could be utilized in other environments. However, when the tray is to be utilized for use in baking a product, such as pizza, cookies, etc., it is to be understood that the tray will be formed of special paperboard which is conventional known as ovenable paperboard wherein the upper surface of the paperboard is coated with a suitable heat resistant plastic layer. Inasmuch as the ovenable paperboard is commercially available and not in of itself a part of the invention, no further attempt will be made to describe the paperboard from which the blanks and trays are formed.

Although only a preferred embodiment of the invention has been specifically illustrated and described herein, it is to be understood that minor variations may be made in the tray construction without departing from the spirit and scope of the invention as defined by the appended claims.

I claim:

1. A blank for forming a tray having upstanding side walls, said blank comprising a central base panel having a plurality of edges, inner and outer sidewall panels extending along at least certain of said edges and formed integral with said central base panel, each of said outer sidewall panels being connected along an inner edge thereof to a respective inner sidewall panel along an outer fold line and having a free outer edge, each of said inner sidewall panels being connected to said base panel along an inner fold line, and said inner fold line being interrupted by a plurality of C-shaped cuts formed in the respective inner sidewall panel and opening towards said base panel, said C-shaped cuts defining locking flaps projecting from said base panel for engaging a respective outer sidewall panel free edge, said base panel having an upper surface, and each outer sidewall panel being folded beneath a respective inner sidewall panel and being bonded thereto, each outer sidewall panel underlying said locking flaps formed in said respective inner sidewall panel and outer edge portions of said base panel.

2. A tray comprising a base panel having side edges and upstanding sidewalls along said side edges, each of said sidewalls including inner and outer sidewall panels bonded together in back-to-back relation, said base panel having projecting from each side edge thereof a plurality of spaced locking flaps formed from an adjacent one of said inner sidewall panels, said locking flaps underlying a lower edge of a respective outer sidewall panel and retaining said sidewalls in upstanding product retaining positions, the bond between said inner and outer sidewall panels and the interlock between said outer sidewall panel and said locking flaps forming the sole means for retaining each of said sidewalls in an upstanding position.

3. A tray comprising a base panel having side edges and upstanding sidewalls along said side edges, each of said sidewalls including inner and outer sidewall panels bonded together in back-to-back relation, said base panel having projecting from each side edge thereof a plurality of spaced locking flaps formed from an adjacent one of said inner sidewall panels, said locking flaps underlying a lower edge of a respective outer sidewall panel and retaining said sidewalls in upstanding product retaining positions, each outer sidewall panel being of a height greater than the height of the associated inner sidewall panel, each sidewall sloping inwardly into overlying relation to said base panel.

4. A tray comprising a base panel having side edges and upstanding sidewalls along said side edges, each of said sidewalls including inner and outer sidewall panels bonded together in back-to-back relation; said base panel having projecting from each side edge thereof a plurality of spaced locking flaps formed from an adjacent one of said inner sidewall panels, said locking flaps underlying a lower edge of a respective outer sidewall panel and retaining said sidewalls in upstanding product retaining positions, all of said inner and outer sidewall panels being free at each end thereof.

* * * * *